US011153387B2

(12) United States Patent
Jepperson et al.

(10) Patent No.: US 11,153,387 B2
(45) Date of Patent: Oct. 19, 2021

(54) DECENTRALIZED NETWORK PROTECTED IOT QUERY RESOLUTION

(71) Applicant: International Business Machines Corporation, Armonk, NY (US)

(72) Inventors: Jacob Ryan Jepperson, Austin, TX (US); Zachary A. Silverstein, Jacksonville, FL (US); Shikhar Kwatra, Durham, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/809,603

(22) Filed: Mar. 5, 2020

(65) Prior Publication Data

US 2021/0280325 A1 Sep. 9, 2021

(51) Int. Cl.
| | |
|---|---|
| *H04L 29/08* | (2006.01) |
| *G16Y 40/10* | (2020.01) |
| *G16Y 40/35* | (2020.01) |
| *G16Y 40/50* | (2020.01) |
| *G06F 40/10* | (2020.01) |
| *G06F 9/38* | (2018.01) |
| *G16Y 20/10* | (2020.01) |

(52) U.S. Cl.
CPC .......... *H04L 67/12* (2013.01); *G06F 9/3836* (2013.01); *G06F 40/10* (2020.01); *G16Y 20/10* (2020.01); *G16Y 40/10* (2020.01); *G16Y 40/35* (2020.01); *G16Y 40/50* (2020.01)

(58) Field of Classification Search
CPC ........ H04L 67/12; G16Y 40/10; G16Y 40/35; G16Y 40/50; G16Y 20/10
See application file for complete search history.

(56) References Cited

U.S. PATENT DOCUMENTS

| | | | |
|---|---|---|---|
| 9,703,616 B2 | 7/2017 | Bauerle | |
| 10,275,214 B2* | 4/2019 | Bjorkengren | ........... G10L 15/22 |

(Continued)

OTHER PUBLICATIONS

"Cyber security solutions for your home and business | F-Secure", printed Feb. 13, 2020,2 pages, <https://www.f-secure.com/en_US/welcome>.

(Continued)

*Primary Examiner* — Jason D Recek
(74) *Attorney, Agent, or Firm* — Tyrus S. Cartwright (57) ABSTRACT

A method for processing commands in a network, wherein audio data is received at a local IoT device that is one of a plurality of IoT devices connected to the network. The audi data corresponds to a first data type. The audio data may be determined to include a command destined for a remote device, wherein the local IoT device cannot execute the command. The plurality of networked IoT devices may be queried to determine if the command is associated with a remote network device, wherein the remote IoT device is compatible with the remote device command type. Further, the method determines that the remote IoT device is not compatible with local type commands. The method may then convert the audio data to text data, wherein the second IoT device is compatible with the text data. The text data may then be transmitted to the remote IoT device for execution.

20 Claims, 5 Drawing Sheets

(56) References Cited

U.S. PATENT DOCUMENTS

| | | | |
|---|---|---|---|
| 2002/0112084 A1* | 8/2002 | Deen | G06F 13/387 |
| | | | 709/250 |
| 2013/0173621 A1 | 7/2013 | Kapoor | |
| 2017/0149937 A1* | 5/2017 | Ren | H04W 4/70 |
| 2017/0201585 A1* | 7/2017 | Doraiswamy | H04L 67/2804 |
| 2017/0359417 A1* | 12/2017 | Chen | G06Q 30/01 |
| 2018/0342151 A1 | 11/2018 | Vanblon | |
| 2019/0045346 A1 | 2/2019 | Macieira | |
| 2020/0068045 A1* | 2/2020 | Tomizuka | G06F 9/541 |
| 2020/0092376 A1* | 3/2020 | Morris | H04L 41/12 |
| 2021/0136433 A1* | 5/2021 | Hong | H04N 21/236 |

OTHER PUBLICATIONS

IBM,"Explore the Internet of Things (IoT) | IBM Watson IoT", printed on Feb. 13, 2020, 7 pages, <https://www.ibm.com/internet-of-things/solutions/iot-platform>.

"Gartner Says Global IT Spending to Reach $3.8 Trillion in 2019", Stamford, Conn., Jan. 28, 2019, © 2019 Gartner Inc., 4 pages, <https://www.gartner.com/en/newsroom/press-releases/2019-01-28-gartnener-says-global-it-spending-to-reach-3-8 trillio>.

"Global Internet of Things (IoT) Market, to witness a CAGR of 26.6% during 2018 to 2024 : Energias Market Research Pvt. Ltd.", Apr. 17, 2018, Source: Energias Market Research, © 2019 GlobeNewswire, Inc., 3 pages.

"SmartThings. Add a little smartness to your things", © 2019 SmartThings Inc, 2 pages, <https://www.smartthings.com/about>.

* cited by examiner

DECENTRALIZED NETWORK PROTECTED IOT QUERY RESOLUTION

BACKGROUND

The present invention relates generally to the field of processing network communications, and more particularly to processing commands in a network.

Internet of Things (IoT) refers to the concept of extending internet connectivity beyond conventional computing platforms such as personal computers and mobile devices, and into any range of traditionally non-internet-enabled physical devices and everyday objects. Embedded with electronics, internet connectivity, and other forms of hardware (such as sensors), these devices and objects can communicate and interact with others over the Internet, and the devices and objects can be remotely monitored and controlled.

The definition of IoT has evolved due to convergence of multiple technologies, real-time analytics, machine learning, commodity sensors, and embedded systems. Traditional fields of embedded systems, wireless sensor networks, control systems, automation (including home and building automation), and others all contribute to enabling the IoT. In the consumer market, IoT technology is most synonymous with products pertaining to the concept of the "smart home," covering devices and appliances (such as lighting fixtures, thermostats, home security systems and cameras, and other home appliances) that support one or more common ecosystems, and can be controlled via devices associated with that ecosystem, such as smartphones and smart speakers.

The IoT concept has faced prominent criticism, especially in regard to privacy and security concerns related to these devices and their intention of pervasive presence. IoT devices can be sloppily installed with default passwords that are publicly available on the Internet. Security experts say "backdoors" that allow someone outside the IoT network to bypass security protections are often difficult to identify. Such vulnerabilities can be accidental, the result of flaws in the software's original design or in updates.

SUMMARY

Aspects of an example embodiment of the present invention disclose a method, computer program product, and computer system for processing commands in a network. One embodiment of the invention may include receiving first data at a first IoT device, wherein the first IoT device may be one of a plurality of IoT devices connected to a network. The first data may correspond to a first data type. The example embodiment may determine that the first data includes a command that may correspond to a first command type. It may also be determined that the first IoT device cannot execute the command, resulting in an error notification provided to a user.

The example embodiment of the present invention may also include querying the plurality of IoT devices to determine if the command is associated with at least one of the plurality of IoT devices. The command may be determined to be associated with a second IoT device of the plurality of IoT devices, wherein the second IoT device may be compatible with the first command type. The example embodiment may further include determining that the first data type is not compatible with the second IoT device. The first data may be converted to second data, wherein the second data may correspond to a second data type that may be compatible with the second IoT device. Additionally, the example embodiment may further include transmitting the second data to the second IoT device via a communications medium within the network. The second data may be transmitted to the second IoT device so that the second IoT device may process or execute the command included in the second data.

Additionally, the command may be determined to be associated with the second IoT device if the command matches at least one command the second IoT device is configured to execute. The first data may be audio data received at a microphone that may be electronically coupled with the first IoT device. The first IoT device may not be able execute the command because the first IoT device may not be configured to execute first command type of commands. The first command type may be configured to operate a remote IoT device, wherein a second command type may be configured to operate a local IoT device. The example embodiment may further comprise transmitting a response from the second IoT device to the first IoT device, the response may indicate that the command was executed at the second IoT device. The first data may be converted to second data using a natural language engine (NLU), wherein the second data may be text data.

DETAILED DESCRIPTION

IoT devices are sometimes configured to listen for, or audibly detect, specific key words or wake words to trigger or summon their programmed functionalities. In a centralized network, these features are facilitated by a virtual assistant, but there appears to be no robust solution for such implementations in a decentralized network. The single centralized virtual assistant may interact with a knowledge system or a knowledge engine to trigger or implement functionalities in connected child or satellite devices. All transactions are owned and distributed from this central point in the network but only triggered via specific keywords and when a user is within close enough proximity to this centralized virtual assistant. In other words, there is a one-to-one entry point and distribution channel to virtual assistants in the currently available solutions.

Aspects of the invention described herein provide the ability to decentralize the point of entry, execute requests without the need of specific keywords or specific locations, and distribute the transactions across the network through a local channel that may be guided by the knowledge engine to pass inputs and outputs to the intended devices to complete the requested action. Certain aspects of this invention's embodiments facilitate the communication of data of varying types (e.g., text, audio, video) to and from varying devices (e.g., smart TVs, kitchen appliances, temperature control devices) rather than being limited to a single type (e.g., text) to and from a single device (e.g., a smart speaker).

Example embodiments described herein provide for methods, systems and computer program products for capturing an audio query at a nearby IoT device, converting that query via speech to text, resolving that query against itself, and if unsuccessful, passing the query on to another device in a decentralized network, via local port endpoints.

The present invention will now be described in detail with reference to the Figures.

Figure 1:
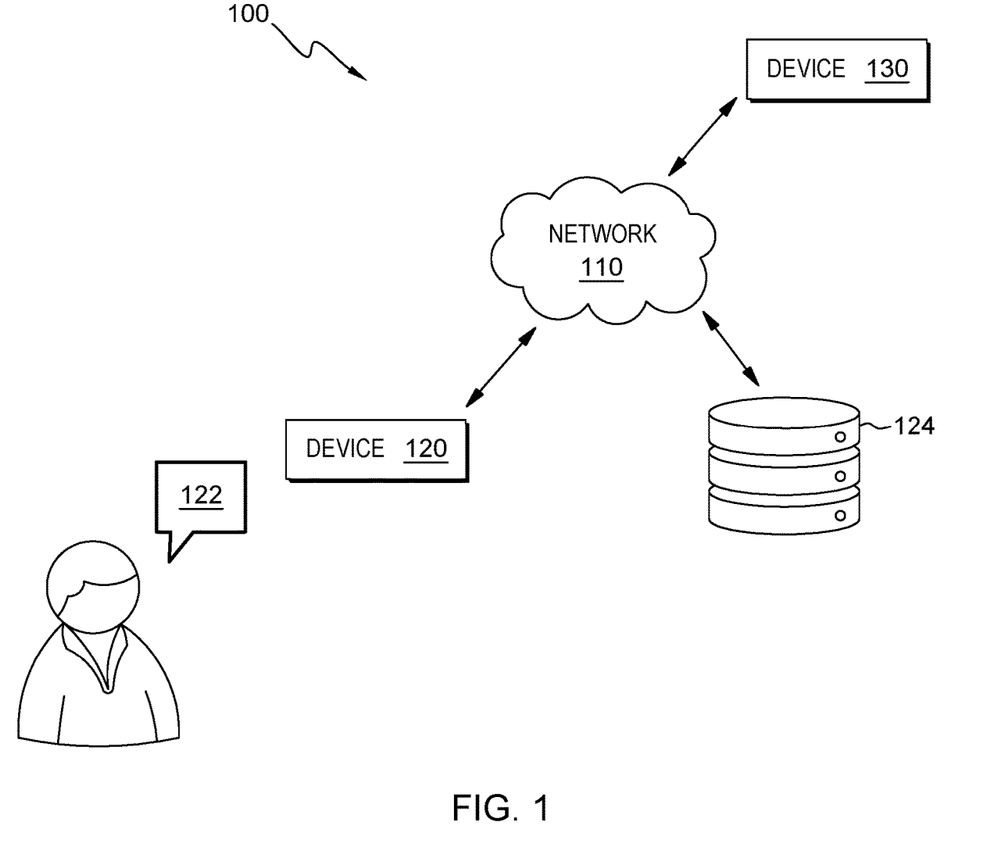
FIG. 1 depicts a block diagram of an IoT computing environment, in accordance with an embodiment of the present invention.

FIG. 1 depicts an IoT computing environment 100 for processing commands, in accordance with an embodiment of the present invention. FIG. 1 provides only an illustration of one embodiment of the present invention and does not imply any limitations with regard to the environments in which different embodiments may be implemented. As shown in FIG. 1, the IoT computing environment 100 includes a network 110 configured to facilitate communication between IoT device 120 and IoT device 130. In one example embodiment, the IoT device 120 may be configured to receive audio data from a user. The audio data may be received or detected by a microphone (not shown) included in IoT device 120. The microphone may also be remotely located from IoT device 120 but still in communication with IoT device 120 via a wired or wireless communication medium. Data may be stored in a database 124 that is in communication with the network 110. The database 124 may also be in communication with either of IoT device 120 and IoT device 130 independent of the network 110.

IoT device 120 and IoT device 130 may be configured with a processor, memory, and peripherals (not shown) to receive and process the audio data. For example, IoT device 120 may receive the audio data via a microphone, process the audio data to determine that the audio data includes a command, wherein the command is an instruction for IoT device 120 or another IoT device to perform a task or function. The audio data may be converted to another data format or data type. The command may also be converted from its current command type to another command type, which will be further described later herein. The IoT computing environment 100 may include additional servers, computers, IoT devices, or other devices not shown.

IoT device 120 and IoT device 130 may include a network module (not shown) configured to establish a network connection with the network 110. Via this network connection with the network 110, IoT device 120 may transmit and receive data communications with the network 110. The network 110 may be configured as an IoT network 110. The network 110 may operate as a computing network that can be, for example, a local area network (LAN), a wide area network (WAN), or a combination of the two, and can include wired, wireless, or fiber optic connections. In an embodiment, IoT network 110 may be a private/secure network that may include a firewall to block unauthorized access to or from IoT network 110 while permitting outward communication. In general, IoT network 110 can be any combination of connections and protocols that may support communications between all devices connected to the network 110, including but not limited to IoT device 120 and IoT device 130.

In an example embodiment, IoT device 120 may be a smart speaker (e.g., Amazon Echo, Apple HomePod, Google Home) equipped with a virtual assistant (e.g., Alexa, Siri, GoogleNow). IoT device 120 may be configured to operate in the way a person of ordinary skill in the art would understand such smart speaker to operate. For example, IoT device 120 may be in a listening mode to listen for a voice command from a user within proximity of the IoT device 120. IoT device 120 may detect a wake word or wake phrase (e.g., "Alexa", "hey Ski", "OK Google") followed by a command to perform a specific task. Aspects of the invention may allow for various command types that trigger different operations. For example, a first command type may be a remote device operation command may trigger a remote IoT device to perform a specific task. Another command type may be a local device operation command may trigger a local IoT device to perform a specific task. Other command types may include system command types, wherein the command may initiate system operations to configure the device settings of IoT device 120 and IoT device 130.

IoT device 120 may receive a voice command 122 and determine that the voice command 122 is audio data. The audio data may be processed and converted to text data or some other data type depending on the intended use or uses for that data. If the command is a local command type, IoT device 120 may be configured to process the command and execute it locally at IoT device 120. If the command is a remote device operation command type, then IoT device 120 may determine that IoT device 120 cannot execute the command locally and return an error message. Further, if the command is a remote device operation command type, IoT device 120 may submit a query request to the network 110 to determine what other devices are connected to the network 110 that are configured with open ports to accept requests. For example, a plurality of IoT devices may be connected to network 110 in a way similar to the way IoT device 120 is connected to network 110.

In response to the query request, at least one of the plurality of IoT devices may respond to the query request and provide information about that IoT device to network 110 and then to IoT device 120. For example, a second IoT device 130 may transmit a response to the query request with information about IoT device 130. IoT device 130 may be remotely located from IoT device 120. In other words, IoT device 130 may be a remote IoT device 130. The information may include a MAC address, device capabilities, list of commands and other information pertinent to the specific IoT device 130. For example, the list of commands may include basic functions (e.g., power on, power off, sleep mode, wake from sleep mode). The list of commands may also include commands that are advanced beyond the basic functions. For example, in the case of the remote IoT device 130 that may be a toaster, one of the commands may be to toast for a definite period of time (e.g., 30 seconds), or to toast at a specific temperature level (e.g., 350 degrees Fahrenheit).

The local IoT device 120 or the remote IoT device 130 may operate to execute and display a user interface for interacting with an owner and/or authorized user of IoT device 120 or IoT device 130 and/or IoT network 110. In an example embodiment, local IoT device 120 may be configured to send and/or receive data from network 110 and/or remote IoT device 130. In some embodiments, IoT devices 120, 130 may each be a management server, a web server, or any other electronic device or computing system capable of receiving and sending data. In some embodiments, IoT devices 120, 130 may each be a laptop computer, tablet computer, netbook computer, personal computer (PC), a desktop computer, a smart phone, or any programmable electronic device capable of communicating with other IoT devices via network 110. IoT devices 120, 130 may each include components as described in further detail in FIG. 4.

Database 124 may operate as a repository for IoT data and other data (e.g., device type profiles, device profiles, data usage patterns, and data usage models) that may be associated with IoT device data. A database is an organized collection of data. Database 124 can be implemented with any type of storage device capable of storing data and configuration files that can be accessed and utilized by either of IoT device 120 or IoT device 130, such as a database server, a hard disk drive, or a flash memory. In an embodiment, database 124 may be accessed by local IoT device 120 and/or remote IoT device 130 to store IoT data, device type profiles, device profiles, data usage patterns, and data usage models. In another embodiment, database 124 may be accessed by local IoT device 120 and/or remote IoT device 130 to access IoT data, device type profiles, device profiles, data usage patterns, and data usage models. In the depicted embodiment, database 124 may reside independent of the network. In another embodiment, database 124 may reside elsewhere within IoT computing environment 100 provided database 124 has access to IoT network 110.

Device types include, but are not limited to, physical security devices, smart appliances, personal devices, entertainment devices, etc.

A device profile includes, but is not limited to, an IoT device identifier (ID), an IoT device type (e.g., a smart lock), data usage patterns for that IoT device, and data usage models for that IoT device. Data usage patterns may include data type, data use frequency, and IoT device data use history. A device profile may be created for each IoT device in IoT network 110. IoT devices may consider data usage patterns and data usage models in a device profile when determining whether to execute a data usage request by an IoT device.

IoT devices 120 and 130 may operate as physical devices and/or everyday objects that are embedded with electronics, Internet connectivity, and other forms of hardware (e.g., sensors). In general, IoT devices can communicate and interact with other IoT devices over the Internet or a local network while being remotely monitored and controlled. Types of IoT devices include, but are not limited to, smart locks, garage doors, refrigerators, freezers, ovens, mobile devices, smart watches, air condition (A/C) units, washer/dryer units, smart TVs, virtual assistance devices, and any other smart home devices. In several embodiments, IoT network 110 contains additional IoT devices (not shown).

In another example embodiment, a user may be permitted to agree to a terms and service agreement upon setting up IoT devices with network 110. The user agreement may document the purpose of the information and data sharing between IoT devices 120, 130 and provide access to IoT devices on the network that have been designated for participation in network 110. The user agreement may include all mentioned passing devices that would allow control(s), trigger(s), or action(s) to be executed based on the user's original request. For networks with multiple users and multiple IoT devices, the system may extend the usage agreement to a defined or dynamic group, upon a new user joining said group.

For example, disparate IoT devices of a given household may be placed throughout and connected to a Wi-Fi network. At least one of the connected devices my include a microphone configured to listen for commands from a user. The IoT devices connected to the network may include local communication ports that may be in an open state to accept text data and treat the text data as text input to a logic engine. The connection to the Wi-Fi network may setup similarly to how a user may setup a smart plug or smart lightbulb, as known to a person of ordinary skill in the art. An IoT device may detect a user's voice using a microphone, wherein the voice will be received as audio data at the IoT device, wherein the IoT device may be configured to translate the audio data to text data, either locally or via the network connected to a database or a cloud database. The text data that was converted from audio data may be ingested as a text string into a logic engine to determine what the user's intent or command is via the Natural Language Unit (NLU) engine (not shown). The NLU engine may attempt to resolve the query against onboard capabilities of the IoT device. If the IoT device receives a successful query, the IoT device may be configured to execute the targeted function or command and initiate functionality on the IoT device.

However, if the IoT device receives a failed query, then the IoT device may ping devices on the network, which may include sending a broadcast signal based on proximity to the IoT device identified via routing signal distance and computed using a packet transfer rate. The packet transfer rate may be determined as follows: Propagation time=distance/propagation speed. Dynamic push may be based on a certain number of connect exchanges through IoT network 110. Static limitation may be based on a certain amount of time (temporal defined request) in seconds, minutes, hours, etc. A hybrid model may be based on a temporal event as well as a dynamic maximum event to be defined when setting up the IoT devices on network 110. If the IoT device receives a failed query, the system may be configured to explore network connected devices for active ports that are configured to receive input or requests. Inputs may be audio data or text data. Next, the system may be configured to verify if the ports are related or associated with IoT device functionality.

According to another example embodiment, the method may include IoT device 120 sending a request to an open port or open endpoint if a nearby IoT device 130 is within reach of the request. For example, a JSON payload header script may be created to be able to enable the connection via dynamically opening the passive listening port of the active IoT device. Metadata may be included in the data communications. For example, metadata attributes may include, but not limited to:

1. ["command name": Type<0: Text, 1: Audio>
2. "device port/id"
3. "language"
4. "created": The timestamp for creation of the connection by pinging @ specific data/time.
5. "description": Processed command using Bag of Words algorithm
6. "workspace_id": <245edf96-b89f-46ac-b647-c6618b2eb5f0">
7. "learning_opt_out"}

The method may include querying and attempting to process the command included in the audio data at each IoT device in the network until the command is successfully executed. If all IoT devices have been queried and attempted to execute the command unsuccessfully, the IoT device may communicate a failed message to the user. Also, if an IoT device has been queried successfully, a message may be communicated to the user validating the transaction. The message may include the IoT device broadcast name or identification.

Figure 2A:
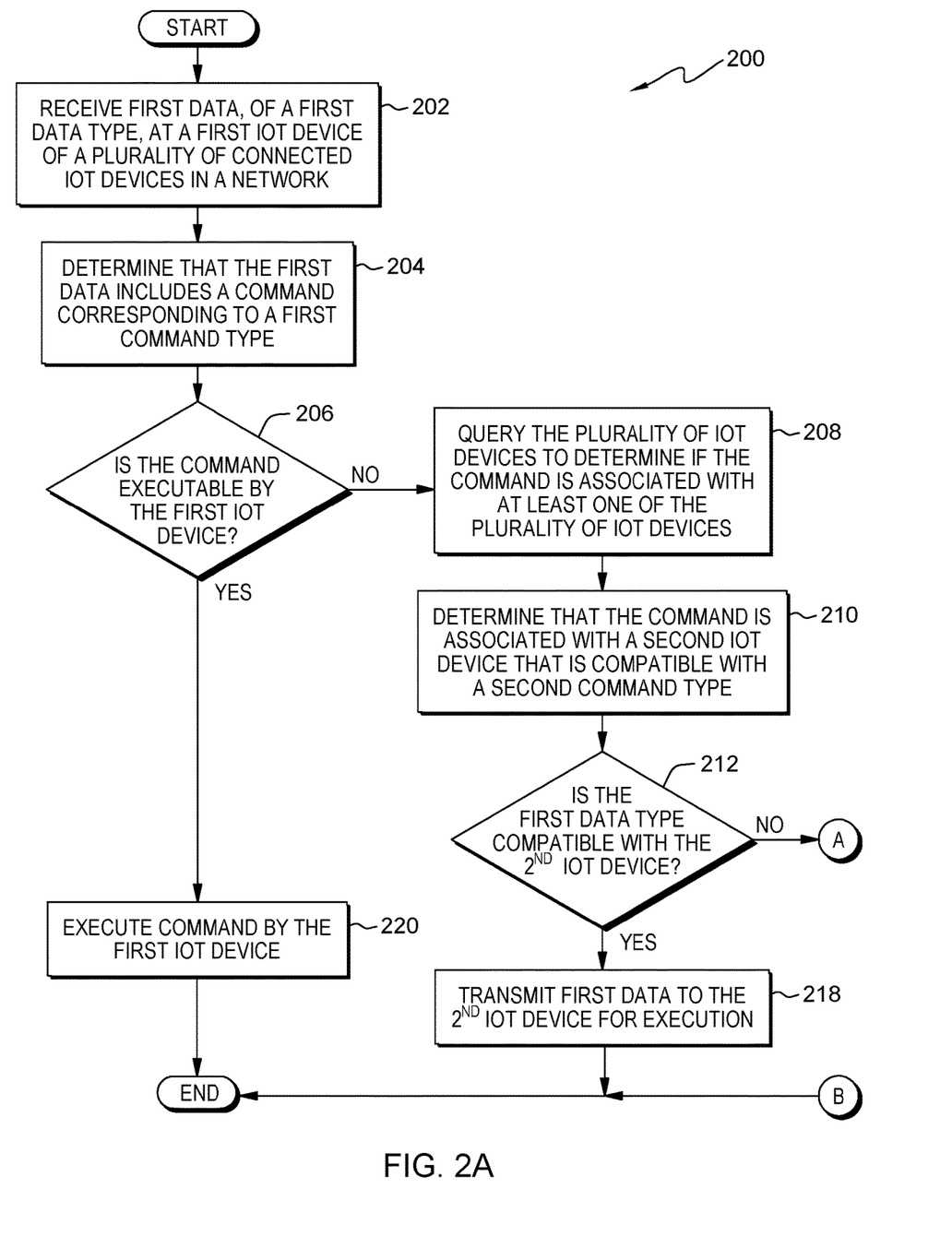
FIGS. 2A-2B depict a flowchart of a method for processing commands in a network, in accordance with an embodiment of the present invention.

Referring to FIG. 2A, the method 200 for processing commands in a network may include receiving 202 first data at a first IoT device wherein the first IoT device may be one of a plurality of IoT devices connected to a network. The first data may correspond to a first data type. The example embodiment may determine 204 that the first data includes a command that may correspond to a first command type, wherein the first command type may be a remote command type configured to operate a remote IoT device. The command may alternatively be a local command type configured to operate the first (local) IoT device. The method 200 may further determine 206 that the first IoT device cannot execute the command, which may result in an error notification provided to a user. Alternatively, the method may determine that the first IoT device can execute the command, wherein the first IoT device may be configured to execute 220 the command.

The example embodiment of the present invention may also include querying 208 the plurality of IoT devices to determine if the command is associated with at least one of the plurality of IoT devices. Further, method 200 of the example embodiment may determine 210 that the command may be associated with a second IoT device of the plurality of IoT devices, wherein the second IoT device may be compatible with the first command type. The example embodiment may further include determining 212 that the first data type is not compatible with the second IoT device. Alternatively, this example embodiment may also determine that the first data type is compatible with the second IoT device, wherein the first IoT device may transmit first data to the second IoT device without the first IoT device performing any data conversions on the first data. If the first data type is determined to be compatible with the second IoT device, then the method may include transmitting 218 the first data to the second IoT device for execution by the second IoT device.

Additionally, the command may be determined to be associated with the second IoT device if the command matches at least one command in which the second IoT device is configured to execute. The first data may be audio data received at a microphone that may be electronically coupled with the first IoT device. The first IoT device may not be able execute the command because the first IoT device may not be configured to execute first command type of commands. The first command type may be configured to operate a remote IoT device, wherein a second command type may be configured to operate a local IoT device. The example embodiment may further comprise transmitting a response from the second IoT device to the first IoT device, the response may indicate that the command was executed at the second IoT device. The first data may be converted to second data using a natural language engine (NLU), wherein the second data may be text data.

Figure 2B:
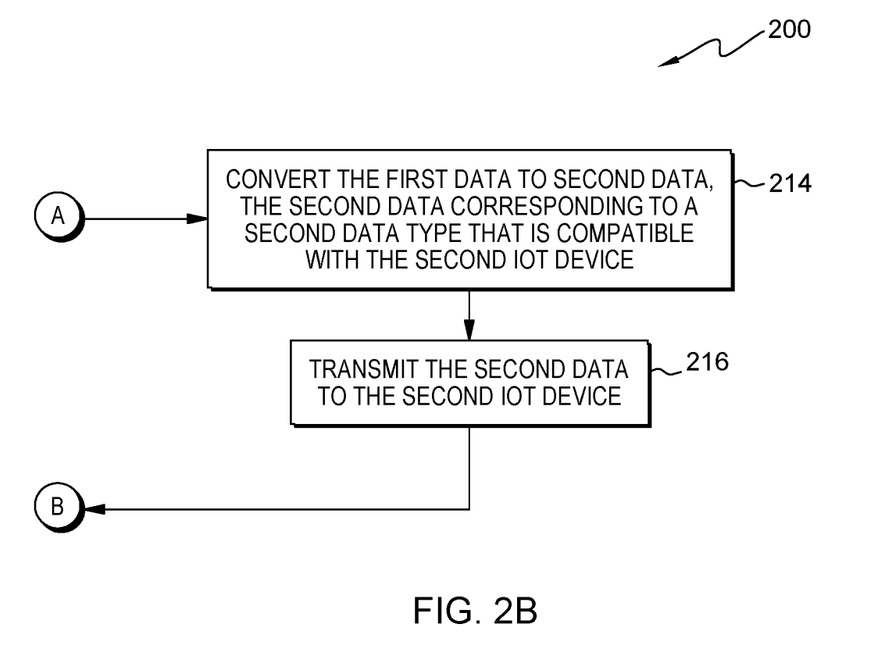

Referring to FIG. 2B, if the first data type is determined to be not compatible with the second IoT device, then the first data may be converted 214 to second data, wherein the second data may correspond to a second data type that is compatible with the second IoT device. Additionally, the example embodiment may further include transmitting 216 the second data to the second IoT device via a communications medium within network 110. The second data may be transmitted to the second IoT device so that the second IoT device may process or execute the command included in the second data.

Figure 3:
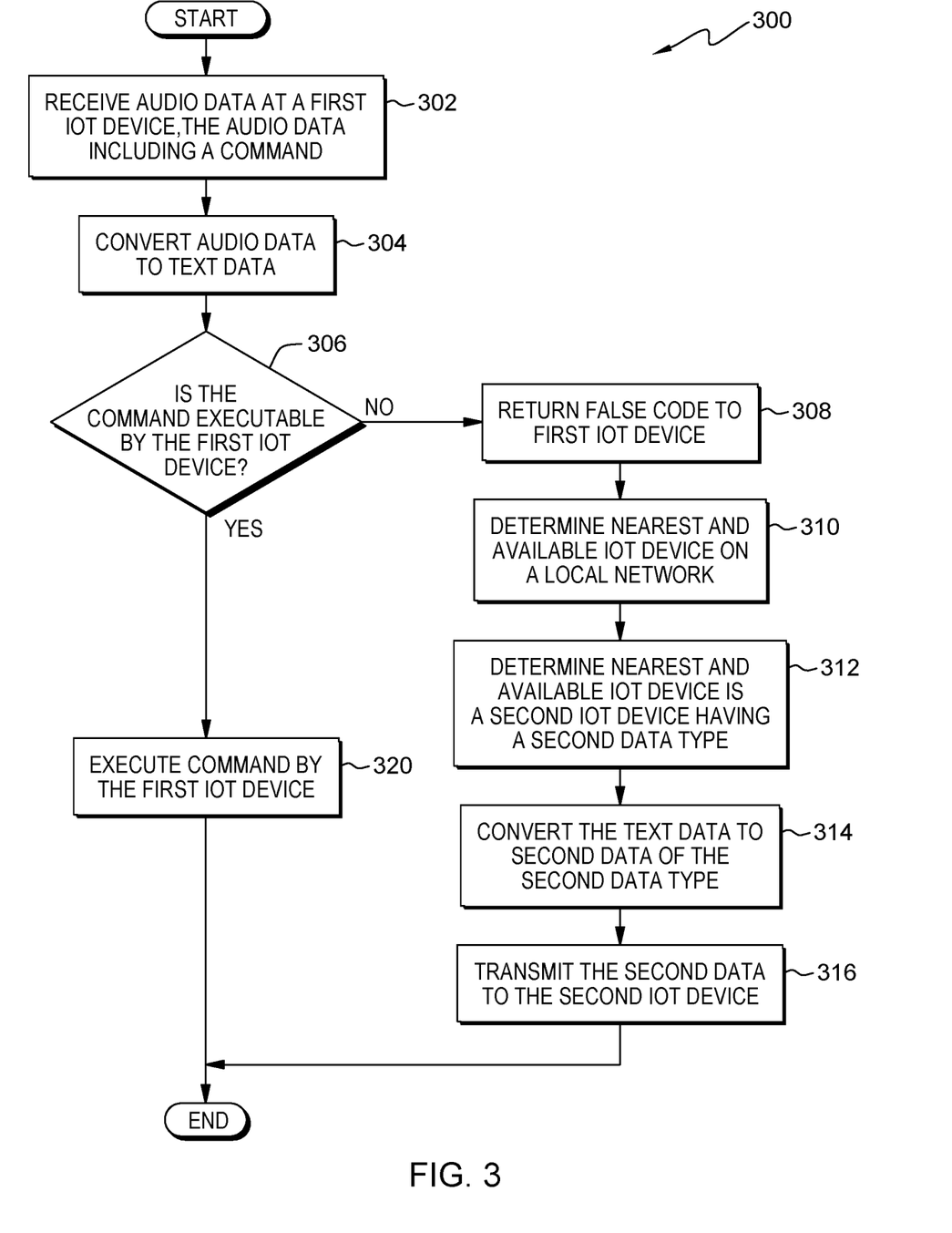
FIG. 3 depicts a flowchart of a method for processing commands in a network, in accordance with an embodiment of the present invention.

Now referring to FIG. 3, another example embodiment of a method 300 for processing commands in a network may include receiving 302 audio data at a first IoT device, wherein the audio data may include a command. The method 300 may further include converting 304 audio data to text data, for various reasons. For example, the audio data may be converted to text data so that an IoT device, to which a command is directed, may be able to process the command in text data format, where audio data format may not be compatible with the IoT device.

The method 300 may also include determining 306 whether the command is executable by the first IoT device. Executability may be determined at least in part by either determining if the command type is a local command type or a remote command type, wherein a local command type indicates the command should be executed by the first IoT device that is proximally located to the user, whereas a remote command type indicates the command should be executed by a second IoT device that is remotely located from the user. If the command is determined to not be executable by the first IoT device, or the local IoT device, then the method 300 may include returning 308 a false code or error message to the first IoT device. The false code may be a visual, audible, or physical indicator detectable by a user.

Once the error message is returned to the local IoT device, the method 300 may further include determining 310 the nearest and available IoT device within network 110. The nearest and available IoT device may be determined by pinging network 110 and receiving a response from each IoT device that has an open port for communication with devices connected to the network. Each IoT device that has an open port and is in communication with the network may send a response, via the network, to the local IoT device to indicate its availability and proximity to the local IoT device.

The method 300 may further include determining 312 that the nearest and available IoT device is a second IoT device, or a remote IoT device. The second IoT device may be compatible with a second data type, wherein the second data type may be different from the first data type. For example, the second data type may be a text data type whereas the first data type may be an audio data type. As another example, the first data type may be the same as the second data type. The data types may be other data types known to those of ordinary skill in the art. Data types may be determined by the manufacturers or software designers of each respective IoT device. IoT devices described herein may also be programmed or reprogrammed to communicate with data types that were not originally intended for said devices. In an example embodiment, the method 300 may determine that the remote IoT device is compatible with a second data type, at least based on the data received in the query response from the remote IoT device.

The method 300 may further include converting 314 the text data to second data corresponding to the second data type. For example, once the remote IoT device is determined to be compatible with text data, the local IoT device may be configured to convert the audio data, received at the local IoT device, to text data. Converting the audio data to text data facilitates executing the command because the remote IoT device may only be configured to execute text data. However, the audio data may be converted to text data independent of determining what data type is compatible with the remote IoT device. For example, the local IoT device may be configured to only process commands that are in the text data format. Nonetheless, the audio data may be converted to other data types that are determined to be compatible with either the local IoT device or the remote IoT device, depending on each device's respective data compatibilities. Converting data from one format to another format may be performed by either of the IoT devices or by another processor in communication with network 110.

The method 300 may further include transmitting 316 the second data to the second IoT device (or remote IoT device), wherein the second data may be the text data that was converted from audio data. The second data may be transmitted via the network or directly to the first (local device) via a communications link independent of the network. The example embodiment may further comprise transmitting a response from the second IoT device to the first IoT device, and the response may indicate that the command was executed at the second IoT device. The first data may be converted to second data using a Natural Language Engine (NLU), wherein the second data may be text data.

According to another example embodiment, the method 300 may include executing 320 the command by the first IoT device if the command is determined to be executable by the first IoT device, wherein the first IoT device may be a local IoT device. The command may be executable by the first IoT device if the command is compatible with the first IoT device. The command may be compatible with the first IoT device if the command type is a local command type and the data type is readable and configured to be processed by the first IoT device.

One example embodiment of this invention may include a user audibly stating, "begin brewing" while laying in bed in a bedroom after waking up from hearing the alarm go off in the morning. The user's phone and TV may be the first devices to detect and receive the audio request and may collaboratively analyze the request. The user's phone and TV may fail to execute (i.e., can't brew coffee) the actions needed to satisfy the request and may then send a message to the decentralized network to ping other network-connected devices. The network-connected devices may then respond and accept the request. A network connected IoT device (e.g., a microwave) may respond with by returning an incompatible response as it is unable to complete the "begin brewing" request or command. Another connected IoT device (e.g., a smart coffee maker) may respond by returning a compatible response as the IoT device is able to complete the "begin brewing" request or command. Further network activity across other network connected devices may be terminated once the coffee maker IoT device has received and successfully completed the request. The coffee maker IoT device may then validate that coffee grounds and water are available and supplied before it begins the brewing process.

The local IoT devices (e.g., phone and TV) that received the command from the user may determine which device is within the closest proximity to the user. The IoT device that is determined to be the closest device may present status messages to the user. For example, if it is determined that the phone is the closest IoT device to the user, the phone may present a status message to the user indicating that the brewing has begun. Further, if it is determined that only one device is capable of providing a status update message to the user, that device may initiate a status message to the user, even though it is determined to be farther away from the user.

Figure 4:
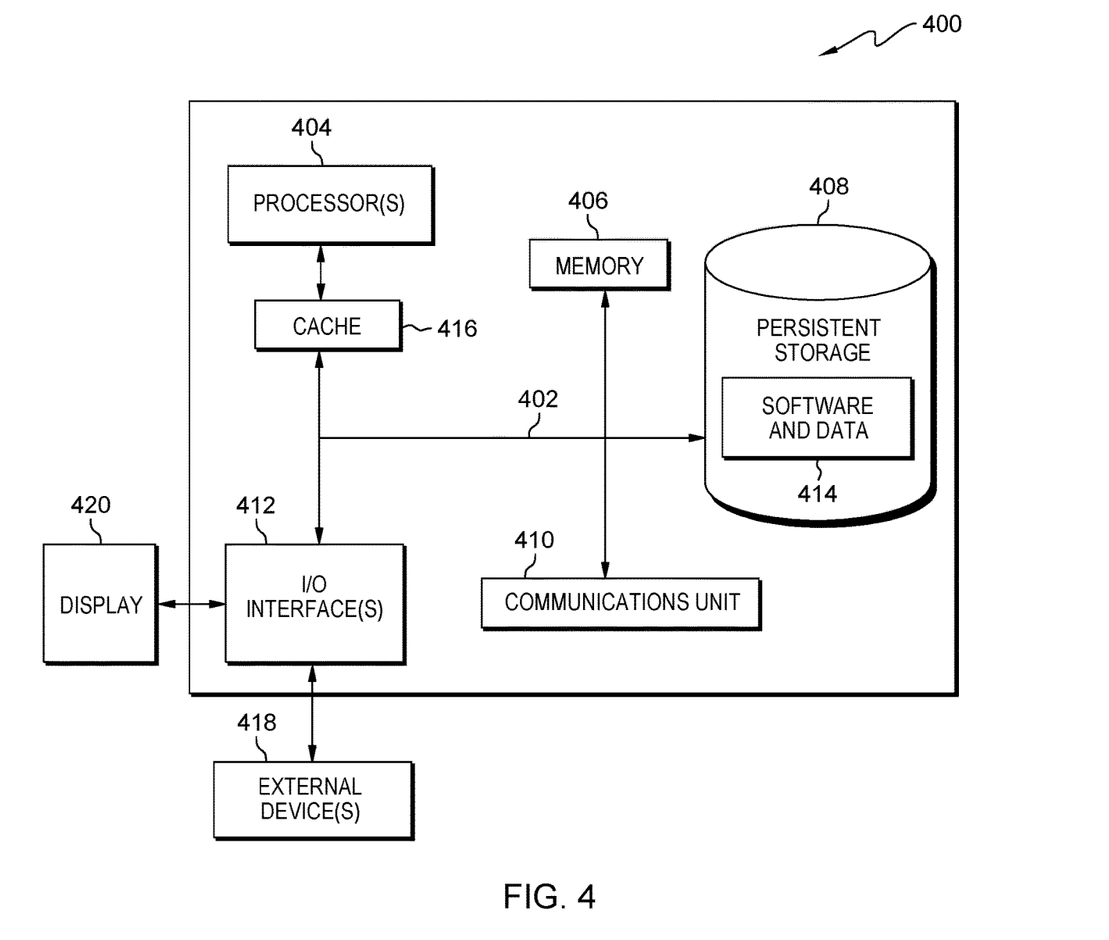
FIG. 4 depicts a block diagram of a computing device of IoT computing environment, in accordance with an embodiment of the present invention.

FIG. 4 depicts a block diagram of computer 400 suitable for local IoT device 120 and/or the remote IoT device 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Software and data 414 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 414 may be downloaded to persistent storage 408 through communications unit 410.

I/O interface(s) 412 allows for input and output of data with other devices that may be connected to IoT device 120, 130. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 414 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

IoT data may include any data used by an IoT device, stored on an IoT device, and sent or received by an IoT device, which can include sensitive IoT data. Sensitive IoT data includes, but is not limited to, biometric data, credit card numbers, personal identification numbers, medical records, passwords, access codes, etc.

The present invention may contain various accessible data sources, such as database 124, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Software and data 414 may enable the authorized and secure processing of personal data. Software and data 414 may be configured to provide informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Software and data 414 may provide information regarding personal data and the nature (e.g., type, scope, purpose, duration, etc.) of the processing. Software and data 414 provide the user with copies of stored personal data. Software and data 414 allow the correction or completion of incorrect or incomplete personal data. Software and data 414 allow the immediate deletion of personal data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing commands in a network, the method comprising:
    receiving, by one or more processors, first data at a first IoT device, the first IoT device being one of a plurality of IoT devices connected to the network, the first data corresponding to a first data type;
    determining, by the one or more processors, that the first data includes a command corresponding to a first command type;
    determining, by the one or more processors, that the first IoT device cannot execute the command;
    querying, by the one or more processors, the plurality of IoT devices to determine if the command is associated with at least one of the plurality of IoT devices;
    determining, by the one or more processors, that the command is associated with a second IoT device of the plurality of IoT devices, wherein the second IoT device is compatible with the first command type;
    determining, by the one or more processors, that the first data type is not compatible with the second IoT device;
    converting, by the one or more processors, the first data to second data, the second data corresponding to a second data type that is compatible with the second IoT device; and
    transmitting, by the one or more processors, the second data to the second IoT device.

2. The method of claim 1, wherein the command is determined, by the one or more processors, to be associated with the second IoT device if the command matches at least one command the second IoT device is configured to execute.

3. The method of claim 1, wherein the first data is audio data received at a microphone electronically coupled with the first IoT device.

4. The method of claim 1, wherein the first IoT device cannot execute the command because the first IoT device is not configured to execute the first command type of commands.

5. The method of claim 4, wherein the first command type is configured to operate a remote IoT device.

6. The method of claim 1, further comprising:
    transmitting, by the one or more processors, a response from the second IoT device to the first IoT device, the response indicating that the command was executed at the second IoT device.

7. The method of claim 1, wherein the first data is converted, by the one or more processors, to the second data using a natural language engine (NLU), wherein the second data is text data.

8. A computer program product for processing commands in a network, the computer program product comprising:
    one or more computer readable storage media and program instructions stored on the one or more computer readable storage media, the program instructions comprising:
    program instructions to receive first data at a first IoT device, the first IoT device being one of a plurality of IoT devices connected to the network, the first data corresponding to a first data type;
    program instructions to determine that the first data includes a command corresponding to a first command type;
    program instructions to determine that the first IoT device cannot execute the command;
    program instructions to query the plurality of IoT devices to determine if the command is associated with at least one of the plurality of IoT devices;
    program instructions to determine that the command is associated with a second IoT device of the plurality of IoT devices, wherein the second IoT device is compatible with the first command type;
    program instructions to determine that the first data type is not compatible with the second IoT device;
    program instructions to convert the first data to second data, the second data corresponding to a second data type that is compatible with the second IoT device; and
    program instructions to transmit the second data to the second IoT device.

9. The computer program product of claim 8, wherein the command is determined to be associated with the second IoT device if the command matches at least one command the second IoT device is configured to execute.

10. The computer program product of claim 8, wherein the first data is audio data received at a microphone connected to the first IoT device.

11. The computer program product of claim 8, wherein the first IoT device cannot execute the command because the first IoT device is not configured to execute the first command type of commands.

12. The computer program product of claim 11, wherein the first command type is configured to operate a remote IoT device.

13. The computer program product of claim 8, further comprising program instructions to transmit a response from the second IoT device to the first IoT device, the response indicating that the command was executed at the second IoT device.

14. The computer program product of claim 8, wherein the first data is converted to the second data using a natural language engine (NLU), wherein the second data is text data.

15. A computer system for processing commands in a network, the computer system comprising:
    one or more computer processors;
    one or more computer readable storage media;

program instructions stored on the one or more computer readable storage media for execution by at least one of the one or more processors, the program instructions comprising:

program instructions to receive first data at a first IoT device, the first IoT device being one of a plurality of IoT devices connected to the network, the first data corresponding to a first data type;

program instructions to determine that the first data includes a command corresponding to a first command type;

program instructions to determine that the first IoT device cannot execute the command;

program instructions to query the plurality of IoT devices to determine if the command is associated with at least one of the plurality of IoT devices;

program instructions to determine that the command is associated with a second IoT device of the plurality of IoT devices, wherein the second IoT device is compatible with the first command type;

program instructions to determine that the first data type is not compatible with the second IoT device;

program instructions to convert the first data to second data, the second data corresponding to a second data type that is compatible with the second IoT device; and program instructions to transmit the second data to the second IoT device.

16. The computer system of claim 15, wherein the command is determined to be associated with the second IoT device if the command matches at least one command the second IoT device is configured to execute.

17. The computer system of claim 15, wherein the first data is audio data received at a microphone connected to the first IoT device.

18. The computer system of claim 15, wherein the first IoT device cannot execute the command because the first IoT device is not configured to execute the first command type of commands.

19. The computer system of claim 18, wherein the first command type is configured to operate a remote IoT device.

20. The computer system of claim 15, further comprising program instructions to transmit a response from the second IoT device to the first IoT device, the response indicating that the command was executed at the second IoT device.

* * * * *